US011299011B2

(12) United States Patent
Tone et al.

(10) Patent No.: US 11,299,011 B2
(45) Date of Patent: Apr. 12, 2022

(54) VEHICULAR AIR-CONDITIONING APPARATUS AND AIR-CONDITIONING METHOD OF VEHICULAR AIR-CONDITIONING APPARATUS

(71) Applicant: Mitsubishi Electric Corporation, Tokyo (JP)

(72) Inventors: Hiroaki Tone, Tokyo (JP); Masatoshi Urakawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 364 days.

(21) Appl. No.: 16/616,609

(22) PCT Filed: May 22, 2018

(86) PCT No.: PCT/JP2018/019674
§ 371 (c)(1),
(2) Date: Nov. 25, 2019

(87) PCT Pub. No.: WO2018/230278
PCT Pub. Date: Dec. 20, 2018

(65) Prior Publication Data
US 2020/0180399 A1    Jun. 11, 2020

(30) Foreign Application Priority Data
Jun. 12, 2017    (JP) .............................. JP2017-114882

(51) Int. Cl.
*B60H 1/00*    (2006.01)

(52) U.S. Cl.
CPC ..... *B60H 1/00807* (2013.01); *B60H 1/00742* (2013.01)

(58) Field of Classification Search
CPC .. B60H 1/00807; B60H 1/00742; B60H 1/32; Y02T 30/00; B61D 27/0018; B60L 1/00
See application file for complete search history.

(56) References Cited

U.S. PATENT DOCUMENTS

2005/0194125 A1* 9/2005 Asai .................... B60H 1/00792
165/202
2019/0184789 A1* 6/2019 Aizawa .................... B60H 1/00

FOREIGN PATENT DOCUMENTS

GB    2372312 A    8/2002
JP    2002243242 A    8/2002
(Continued)

OTHER PUBLICATIONS

International Search Report (PCT/ISA/210) dated Aug. 7, 2018, by the Japan Patent Office as the International Searching Authority for International Application No. PCT/JP2018/019674.
(Continued)

*Primary Examiner* — Kelly D Williams
(74) *Attorney, Agent, or Firm* — Buchanan Ingersoll & Rooney PC (57) ABSTRACT

A controller performs a prior determination by determining whether air cooling of a passenger compartment by free cooling control is possible based on a target value of a temperature in the passenger compartment that is set in advance, an outdoor air temperature, and an indoor temperature. The controller also performs a free cooling execution determination by determining whether to perform the free cooling control by comparing (i) a free cooling performance value that depends on a temperature difference between the outdoor air temperature and the indoor temperature and indicates a capacity of air cooling by the free cooling control, and (ii) an indoor heat load value that depends on a vehicle occupancy rate of passengers in the passenger compartment and indicates a difficulty of a temperature decrease in the passenger compartment.

7 Claims, 6 Drawing Sheets

(56) References Cited

FOREIGN PATENT DOCUMENTS

| JP | 2011043291 A | 3/2011 | | |
|---|---|---|---|---|
| JP | 2014031950 A | 2/2014 | | |
| WO | WO-2018147039 A1 * | 8/2018 | ......... | B60H 1/00849 |

OTHER PUBLICATIONS

Written Opinion (PCT/ISA/237) dated Aug. 7, 2018, by the Japan Patent Office as the International Searching Authority for International Application No. PCT/JP2018/019674.

* cited by examiner

VEHICULAR AIR-CONDITIONING APPARATUS AND AIR-CONDITIONING METHOD OF VEHICULAR AIR-CONDITIONING APPARATUS

TECHNICAL FIELD

The present disclosure relates to a vehicle air-conditioning apparatus and a method of air-conditioning thereof.

BACKGROUND ART

As disclosed in Patent Literature 1, a technique called free cooling is known. Free cooling is a technique that reduces, even when a room to be air-conditioned is provided with a refrigeration cycle device that is for air-cooling the room to be air-conditioned, the temperature in the room to be air-conditioned by stopping, when an outdoor air temperature is lower than that in the room to be air-conditioned, the refrigeration cycle device and take the outdoor air into the room to be air-conditioned. During such free cooling operation, the refrigeration cycle device is stopped, resulting in energy savings.

CITATION LIST

Patent Literature

Patent Literature 1: Unexamined Japanese Patent Application Kokai Publication No. 2002-243242

SUMMARY OF INVENTION

Technical Problem

In Patent Literature 1, whether the free cooling is performed or not is determined only on the condition of whether a value obtained by subtracting the outdoor air temperature from a target value of the temperature in the room to be air-conditioned is higher than a predetermined threshold is satisfied. However, when the room to be air-conditioned is a passenger compartment of a vehicle, a vehicle occupancy rate of the passengers in the passenger compartment varies constantly, and therefore the determination technique disclosed in Patent Literature 1 is insufficient.

That is, when the outdoor air temperature is not low enough to correspond to the vehicle occupancy rate of passengers in the passenger compartment, the temperature in the passenger compartment may not immediately converge to the above target value via free cooling even when the above condition is satisfied, for example. In such a case, the passengers may not be provided a sufficient level of comfort. Therefore, a technology less likely to cause such a problem is desired.

However, free cooling may achieve energy savings as described above. However, even during a free cooling operation, there is a need to run an outdoor air intake fan that forms an air flow taking the outdoor air into the passenger compartment. Thus, the outdoor air intake fan consumes electric power. Therefore, a technology capable of achieving further energy savings is desired.

The present disclosure is made in consideration of such circumstances, and a first objective of the present disclosure is to provide a vehicle air-conditioning apparatus less likely to create such problems in which the comfort of the passenger compartment is degraded due to operation of unnecessary free cooling, and to provide a method of air-conditioning thereof.

A second objective of the present disclosure is to provide a vehicle air-conditioning apparatus that enables achieving further energy savings than heretofore and a method of air-conditioning thereof.

Solution to Problem

To achieve the above first objective, a vehicle air-conditioning apparatus of the present disclosure includes a refrigeration cycle device attached to a vehicle and including a compressor, the refrigeration cycle device being configured to form, with the compressor, refrigeration cycle for air cooling of a passenger compartment of the vehicle, the compressor being configured to circulate refrigerant in the refrigeration cycle;

an outdoor air damper device switchable between an opened state in which outdoor air is allowed to be taken into the passenger compartment and a closed state in which the outdoor air is blocked from being taken into the passenger compartment;

an outdoor air temperature measurer to measure an outdoor air temperature that is a temperature of the outdoor air;

an indoor temperature measurer to measure an indoor temperature that is a temperature in the passenger compartment; and a controller to perform
refrigeration cycle control to cause the refrigeration cycle device to air-cool the passenger compartment, and
free cooling control to control the outdoor air damper device to be in the opened state, while the compressor is stopped, to take the outdoor air into the passenger compartment,
wherein the controller performs
a prior determination by determining whether the air cooling of the passenger compartment by the free cooling control is possible, based on a predetermined target value of the temperature in the passenger compartment, the outdoor air temperature measured with the outdoor air temperature measurer, and the indoor temperature measured with the indoor temperature measurer, and
a free cooling execution determination by determining, upon the air cooling of the passenger compartment by the free cooling control being determined to be possible in the prior determination, whether to perform the free cooling control by comparing a free cooling performance value and an indoor heat load value, wherein
the free cooling performance value depends on a temperature difference between the outdoor air temperature and the indoor temperature and indicates a capacity of air cooling by the free cooling control, and
the indoor heat load value depends on a vehicle occupancy rate of passengers in the passenger compartment and indicates a difficulty of a temperature decrease in the passenger compartment.

Advantageous Effects of Invention

According to the above configuration, even when air cooling of a passenger compartment by free cooling control is determined to be possible in a prior determination, whether to perform the free cooling control is determined by comparing between a free cooling performance value and an indoor heat load value, and therefore, such a problem of losing comfort of the passenger compartment due to forced free cooling performed is less likely to occur.

DESCRIPTION OF EMBODIMENTS

A vehicle air-conditioning apparatus according to Embodiments 1 to 3 will hereinafter be described with reference to the drawings. Throughout the drawings, the same or similar components are denoted by the same reference signs.

Embodiment 1

Figure 1:
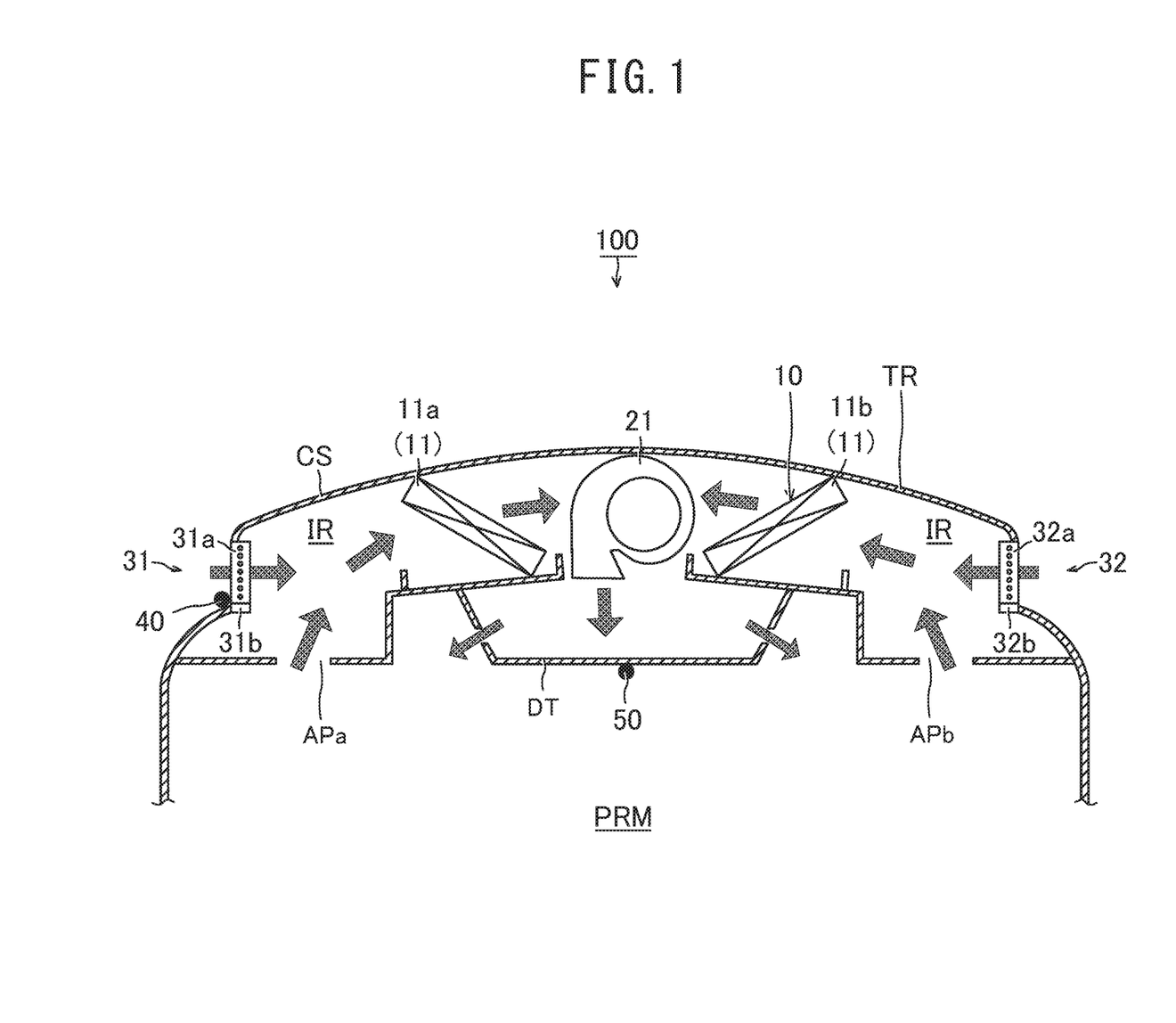
FIG. 1 is a partial cross-sectional view showing a portion of a vehicle air-conditioning apparatus according to Embodiment 1.

As shown in FIG. 1, a vehicle air-conditioning apparatus 100 according to the present Embodiment includes a refrigeration cycle device 10 provided at a ceiling part of a railroad vehicle TR as a vehicle. The refrigeration cycle device 10 forms refrigeration cycle that is for air cooling of a passenger compartment PRM of the railroad vehicle TR. Here, the passenger compartment PRM means a space defined in a railroad vehicle TR where passengers ride.

FIG. 1 shows a configuration of only a part of the refrigeration cycle device 10. The entire configuration of the refrigeration cycle device 10 will be explained below with reference to FIG. 2.

Figure 2:
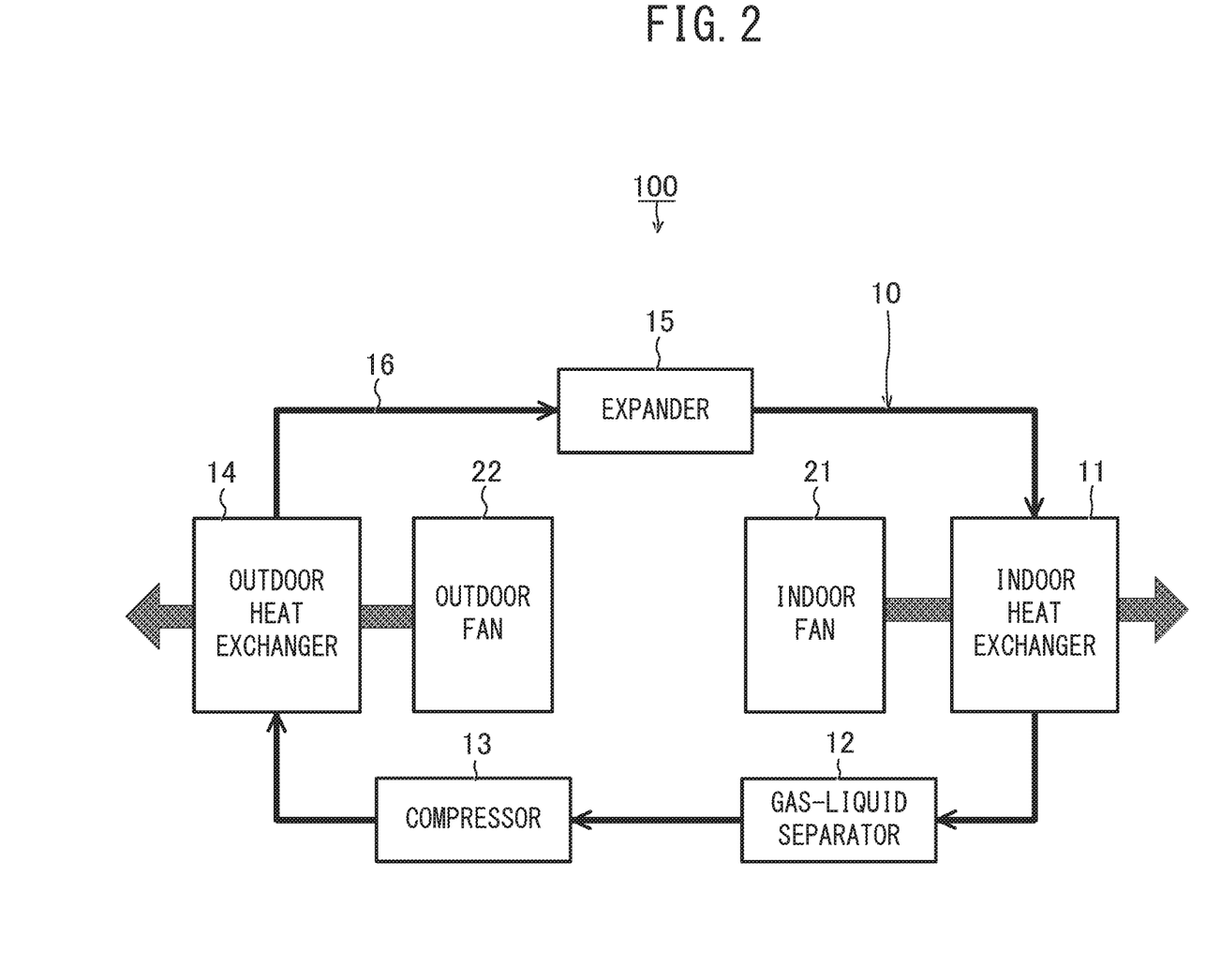
FIG. 2 is a conceptual view showing configuration of a refrigeration cycle device according to Embodiment 1.

As shown in FIG. 2, the refrigeration cycle device 10 includes an indoor heat exchanger 11 as an evaporator that evaporates refrigerant; a gas-liquid separator 12 that separates the evaporated refrigerant from liquid refrigerant; a compressor 13 that compresses the separated gas refrigerant; an outdoor heat exchanger 14 as a condenser that condenses the compressed refrigerant; and an expander 15 that expands the condensed refrigerant. The refrigeration cycle device 10 also includes a refrigerant pipe 16 that connects the indoor heat exchanger 11, the gas-liquid separator 12, the compressor 13, the outdoor heat exchanger 14, and the expander 15 with one another, allowing refrigerant to flow therethrough.

The compressor 13 circulates the refrigerant in the refrigeration cycle formed by the refrigeration cycle device 10. The circulation of the refrigerant brings the indoor heat exchanger 11 and the outdoor heat exchanger 14 respectively into a cooled state and a heated state. The indoor heat exchanger 11 exchanges heat with the air inside the passenger compartment PRM as shown in FIG. 1 to achieve the air cooling of the passenger compartment PRM. Exhaust heat generated in achieving the air cooling is emitted to the outside of the railroad vehicle TR by the outdoor heat exchanger 14.

The compressor 13 sucks the refrigerant into a compression chamber defined inside of the compressor 13, compresses in the compression chamber the sucked refrigerant, and discharges the compressed refrigerant, and repeats this operation. Furthermore, the compressor 13 has an adjustable volume structure that can mechanically switch the capacity of the compression chamber in two stages by a valve.

When the compressor 13 is switched to a state where the capacity of the compression chamber is relatively small (hereinafter referred to as an unloaded state), power consumption by the compressor 13 is decreased. Thus, energy savings can be achieved. However, the circulation amount of refrigerant per unit time in the refrigeration cycle device 10 decreases, thus degrading the capacity of the air cooling of the passenger compartment PRM.

When the compressor 13 is switched to a state where e capacity of the compression chamber is relatively larger (hereinafter referred to as a full-loaded state), the circulation amount of refrigerant per unit time in the refrigeration cycle device 10 increases and thus improves the capacity of the air cooling of the passenger compartment PRM. However, electric power consumption by the compressor 13 increases.

The vehicle air-conditioning apparatus 100 includes an indoor fan 21 that promotes the heat exchange between the indoor heat exchanger 11 and the air, and an outdoor fan 22 that promotes the heat exchange between the outdoor heat exchanger 14 and the air. The indoor fan 21 sends the air that is cooled due to the heat exchange with the indoor heat exchanger 11 into the passenger compartment PRM. Meanwhile, the outdoor fan 22 discharges the air that is heated due to the heat exchange with the outdoor heat exchanger 14 outside of the railroad vehicle TR.

Figure 3:
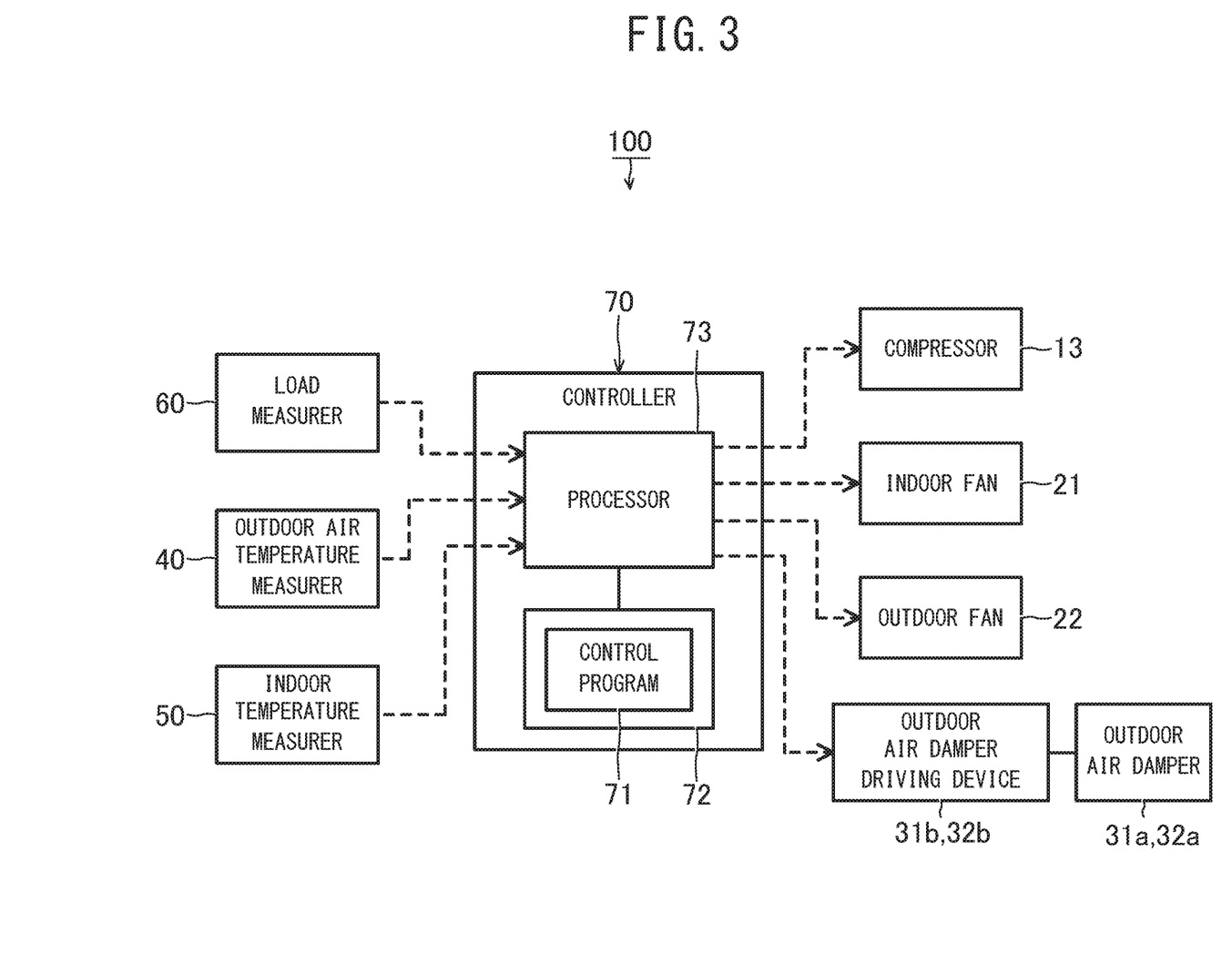
FIG. 3 is a conceptual view showing functions of a controller according to Embodiment 1.

Furthermore, as shown in FIG. 3, the vehicle air-conditioning apparatus 100 further includes a controller 70 that controls the above-described compressor 13, the indoor fan 21, and the outdoor fan 22.

The controller 70 determines whether to make the refrigeration cycle device 10 start air cooling of the passenger compartment PRM. When the refrigeration cycle device 10 starts the air cooling of the passenger compartment PRM, the compressor 13, the indoor fan 21, and the outdoor fan 22 are activated. Furthermore, the controller 70 also controls switching between the full-loaded state and the unloaded state of the compressor 13.

The controller 70 also performs a later-described free cooling control in which the indoor fan 21 is un while the compressor 13 and the outdoor fan 22 are stopped.

Furthermore, the controller 70 also determines whether the temperature in the passenger compartment PRM reaches a predetermined target value during air cooling of the passenger compartment PRM by the refrigeration cycle device 10 and during the above-described free cooling control.

Description is continued again with reference to FIG. 1. FIG. 1 shows only the indoor heat exchanger 11 and the indoor fan 21 from the configuration shown in FIG. 2. The indoor heat exchanger 11 is formed with a first indoor heat exchanger 11a and a second indoor heat exchanger 11b arranged opposite to each other with the indoor fan 21 therebetween. The first indoor heat exchanger 11a, the second indoor heat exchanger 11b, and the indoor fan 21 are housed in an indoor unit chamber IR defined by a casing CS in the ceiling part of the railroad vehicle TR.

The indoor unit chamber IR has return ports APa and APb communicating with the passenger compartment PRM. The indoor fan 21 sucks the air from the passenger compartment PRM up through the return port APa, and allows the sucked-up air to travel through the first indoor heat exchanger 11a, and then bring the heat-exchanged air back to the passenger compartment PRM through a duct DT. The indoor fan 21 sucks the air from the passenger compartment PRM up also through the return port APb, and allows the sucked-up air to travel through the second indoor heat exchanger 11b, and then brings the heat-exchanged air back to the passenger compartment PRM through a duct DT. The air is cooled in the first indoor heat exchanger 11a and the second indoor heat exchanger 11b.

The vehicle air-conditioning apparatus 100 is further equipped with outdoor air damper devices 31 and 32 provided at the casing CS that defines the indoor unit chamber IR.

The outdoor air damper device 31 includes an outdoor air damper 31a that is a valve that regulates an amount of the air outside of the railroad vehicle TR (hereinafter referred to as outdoor air) flowing into the indoor unit chamber IR, and an outdoor air damper driving device 31b that drives the outdoor air damper 31a. The outdoor air damper 31a can be switched between an opened state in which the outdoor air can be taken into the passenger compartment PRM through the indoor unit chamber IR and, a closed state in which the outdoor air is blocked from being taken into the passenger compartment PRM. The outdoor air damper driving device 31b switches the outdoor air damper 31a between the opened state and the closed state.

The outdoor air damper device 32 includes, similarly to the outdoor air damper device 31, an outdoor air damper 32a switchable between an opened state in which the outdoor air can be taken into the passenger compartment PRM and a closed state in which the outdoor air is blocked from being taken into the passenger compartment PRM, and an outdoor air damper driving device 32b that switches the outdoor air damper 32a between the opened state and the closed state.

When the indoor fan 21 runs while the outdoor air dampers 31a and 32a are in the opened state, the outdoor air is taken in through the outdoor air damper 31a and 32a into the indoor unit chamber IR due to wind pressure formed by the indoor fan 21, and the taken in outdoor air is discharged to the passenger compartment PRM through the duct DT.

That is, the indoor fan 21 not only serves to form an air flow that sucks up the air from the passenger compartment PRM (hereinafter referred to as indoor air), but also serves as an outdoor air intake fan that forms the air flow taking the outdoor air into the passenger compartment PRM through the outdoor air damper devices 31 and 32.

When the outdoor air temperature is lower than the indoor air temperature, the passenger compartment PRM can be subjected to the air cooling by taking the outdoor air into the passenger compartment PRM, even when the first indoor heat exchanger 11a and the second indoor heat exchanger 11b are not cooled, that is, even when the compressor 13 and the outdoor fan 22 shown in FIG. 2 are stopped. This process of the air cooling of the passenger compartment PRM with the outdoor air while the compressor 13 and the outdoor fan 22 as shown in FIG. 2 are kept stopped is called free cooling.

To attain the free cooling, a controller 70 as shown in FIG. 3 performs free cooling control that takes the outdoor air into the passenger compartment PRM by bringing the outdoor air dampers 31a and 32a shown in FIG. 1 to the opened state and running the indoor fan 21, while the compressor 13 and the outdoor fan 22 shown in FIG. 2 are stopped.

The free cooling achieves energy savings because the passenger compartment PRM can be subjected to the air cooling without running the compressor 13 and the outdoor fan 22 shown in FIG. 2. In contrast, to perform a free cooling, the condition in which the outdoor air temperature is lower than the indoor air temperature is at least to be satisfied.

For this reason, as shown in FIG. 1, a vehicle air-conditioning apparatus 100 includes, in order to detect that the outdoor air temperature is lower than the indoor air temperature, an outdoor air temperature measurer 40 measuring an outdoor air temperature that is the temperature of the outdoor air, and an indoor temperature measurer 50 measuring an indoor air temperature that is the temperature of the indoor. Detection results of the outdoor air temperature measurer 40 and the indoor temperature measurer 50 are output to a controller 70 shown in FIG. 3.

In contrast, if whether to perform the free cooling or not is based solely on the condition of the outdoor air temperature being lower than the indoor temperature, then forced free cooling may be performed. Specifically, when the outdoor air temperature is not low enough to correspond to the vehicle occupancy rate of the passenger compartment PRM, immediate convergence of the temperature in the passenger compartment PRM to a target value by the free cooling may be difficult even when the outdoor air temperature is lower than the indoor temperature. In this case, the comfort of the passengers is degraded.

Thus, the vehicle air-conditioning apparatus 100 includes a configuration that, taking the vehicle occupancy rate into consideration, suppresses the execution of forced free cooling. This is explained more in detail with reference to FIG. 3.

As shown in FIG. 3, a vehicle air-conditioning apparatus 100 includes, for the purpose of assessing the level of the vehicle occupancy rate, a load measurer 60 that measures a weight of the railroad vehicle TR. The load measurer 60 calculates the weight of the railroad vehicle TR with passengers accommodated in the passenger compartment PRM.

Furthermore, the vehicle air-conditioning apparatus 100 includes the controller 70 that performs a free cooling execution determination that determines whether to perform the free cooling control with the measurement result from the load measurer 60. The calculation to be performed for the free cooling execution determination will be explained in detail below.

The controller 70 calculates the vehicle occupancy rate [%] according to the following formula (1), when the measurement result of the load measurer 60 is A [kg], the weight of only the vehicle body of the railroad vehicle TR without passengers is $C_1$ [kg], and weight of passengers at the capacity of the railroad vehicle TR is $C_2$ [kg].

$$\text{Vehicle occupancy rate [\%]} = 100 \blacksquare (A - C_1) \text{ [Kg]}/C_2 \text{ [kg]} \qquad (1)$$

The controller 70, by using the vehicle occupancy rate [%], calculates an indoor heat load value [W] indicating difficulty of a temperature decrease of the passenger compartment PRM. The indoor heat load value [W] is a physical amount depending on the vehicle occupancy rate [%] so that the indoor heat load value [W] increases with increase in the vehicle occupancy rate [%], and depending on a temperature difference obtained by subtracting the outdoor air temperature from a target value of the temperature in the passenger compartment PRM so that the indoor heat load value [W] decreases with increase in the temperature difference.

Specifically, when a target value of the temperature in the passenger compartment PRM is $T_A$[° C.] and an outdoor air temperature is $T_B$[° C.], the controller 70 calculates the indoor heat load value [W] in accordance with the following formula (2) by using proportionality constants $C_3$[W] and $C_4$[W/° C.]. Here, the measurement result of the outdoor air temperature measurer 40 is used as an outdoor air temperature $T_B$[° C.].

The target value $T_A$ [° C.] is set in advance.

$$\text{Indoor heat load value [W]} = C_3[W] \blacksquare \text{vehicle occupancy rate[\%]} - C_4[W/° C.] \blacksquare (T_A - T_B)[° C.] \quad (2)$$

The controller 70 determines whether this indoor heat load value [W] exceeds a capacity of air cooling of the free cooling control. If the indoor heat load value [W] exceeds the air-cooling capacity, the air cooling by the refrigeration cycle device 10 as shown in FIG. 2 is performed without performing the free cooling control. Accordingly, forced free cooling executed when the vehicle occupancy rate [%] is high can be reduced.

For performing the above-described determination, the controller 70 calculates, in accordance with the following formula (3), the free cooling performance value [W] indicating the capacity of air cooling of the free cooling control.

$$\text{Free cooling performance value [W]} = C_5[W/° C.] \blacksquare (T_C - T_B)[° C.] \quad (3)$$

Here, the measurement result from the indoor temperature measurer 50 is used as the indoor temperature $T_C$[° C.]. Furthermore, $C_5$[W/° C.] is a proportionality constant. As shown in the formulae (3), a free cooling performance value [W] is a physical amount depending on the temperature difference obtained by subtracting the outdoor air temperature $T_B$[° C.] from the indoor temperature $T_C$[° C.] so that the free cooling performance value [W] increases with increase in the temperature difference.

Next, the controller 70 determines whether to perform the free cooling control by comparing the free cooling performance value and the indoor heat load value. The free cooling control is performed only when the free cooling performance value exceeds the indoor heat load value. Such configuration suppresses the execution of forced free cooling.

The configuration of the controller 70 is explained in detail below. The controller 70 includes a storage 72 storing control program 71 which describes the operation of the controller 70, and a processor 73 reading the control program 71 from the storage 72 and executing the program. The storage 72 stores constants $C_1$ to $C_5$ necessary for calculation in the above-described formulae 1 to 3.

The control program 71 allows the processor 73 to achieve the air-cooling control including the later-described processes 1 to 3.

The first process is a prior determination process that determines whether the air cooling of the passenger compartment PRM by the free cooling control is possible.

The second process is a free cooling execution determination process that calculates, upon determination in the prior determination process that the air cooling of the passenger compartment PRM by the free cooling control is possible, an indoor heat load value and a free cooling performance value in accordance with the above formulas (1) to (3), and determines whether to perform the free cooling control by comparing the both values.

The third process is a process for performing refrigeration cycle control to cause the refrigeration cycle device 10 to perform the air cooling of the passenger compartment PRM, in the case of the prior determination process determining that air cooling of the passenger compartment PRM by the free cooling control is not possible, and also in the case of determining in the free cooling execution determination process that the free cooling is not to be performed.

Figure 4:
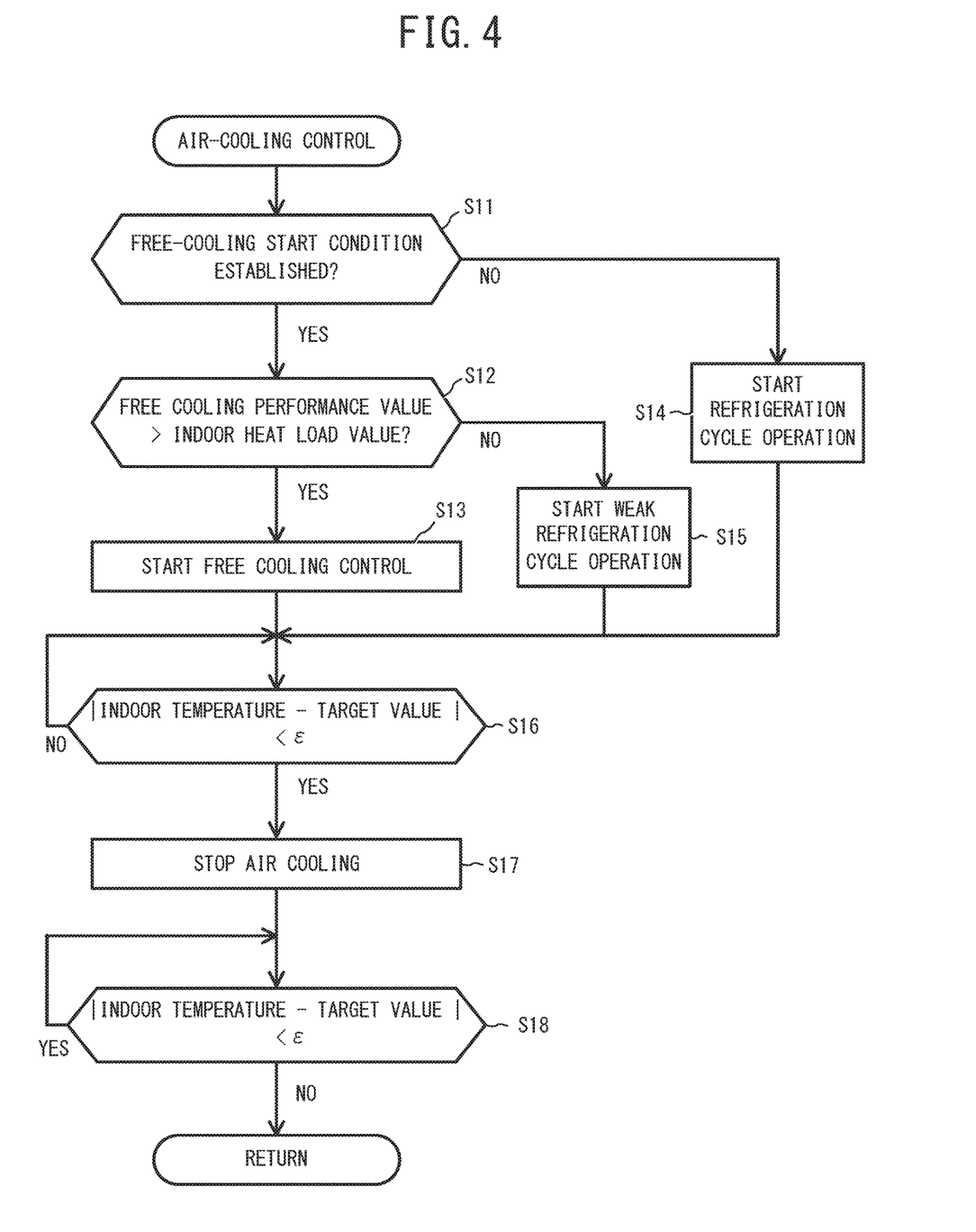
FIG. 4 is a flow chart illustrating procedures of air-cooling control according to Embodiment 1.

The air-cooling control achieved by the control program 71 will be explained below in detail with reference to FIG. 4. Step S11 shown in FIG. 4 is the above prior determination process. Step S12 shown in FIG. 4 is the above free cooling execution determination process. Steps S14 and S15 shown in FIG. 4 are processes that perform the above refrigeration cycle control. These steps are explained below in detail.

As shown in FIG. 4, the controller 70 first performs the prior determination that determines whether a free cooling start condition is established (step S11). Here, establishing the free cooling start condition means that all of the following conditions (a) to (c) are established.

The condition (a): target value $T_A$ of the temperature in the passenger compartment PRM is lower than the indoor temperature $T_C$ and the outdoor air temperature $T_B$ is lower than the target value $T_A$ of the temperature in the passenger compartment PRM. That is, an inequality formula "indoor temperature $T_C$>target value $T_A$>outdoor air temperature $T_B$" is satisfied. The controller 70 applies the measurement result of the indoor temperature measurer 50 and the measurement result of the outdoor air temperature measurer 40 respectively to the indoor temperature $T_C$ and the outdoor air temperature $T_B$. The target value $T_A$ is set in advance. If this condition (a) is not satisfied, the free cooling cannot be performed in principle.

The condition (b): a value obtained by subtracting the outdoor air temperature $T_B$ from an indoor temperature $T_C$ is greater than or equal to a first threshold value X that is set in advance. That is, an inequality formula "indoor temperature $T_C$−outdoor air temperature $T_B$≥first threshold value X" is satisfied. If this condition (b) is not satisfied, cooling down from the indoor temperature $T_C$ cannot be sufficiently and rapidly performed, even when the free cooling is attempted.

The condition (c): the value obtained by subtracting the target value $T_A$ from the indoor temperature $T_C$ is lower than or equal to a predetermined second threshold value Y. That is, inequality formula "indoor temperature $T_C$−target value $T_A$≤second threshold value Y" is satisfied. If this condition (c) is not satisfied, the possibility that the indoor temperature $T_C$ does not reach the target value $T_A$ is high, even when free cooling is attempted.

If all of the above conditions (a) to (c) are satisfied (YES in step S11), the controller 70 determines that the air cooling of the passenger compartment PRM by the free cooling control is possible. Then, the controller 70 performs the free cooling execution determination that determines whether to actually perform the free cooling (step S12).

During the free cooling execution determination (step S12), the controller 70 calculates, in accordance with the above formulae 1 to 3, the indoor heat load value and the free cooling performance value and determines whether the free cooling performance value is greater than the indoor heat load value.

When the free cooling performance value is greater than the indoor heat load value (YES in step S12), the indoor temperature $T_C$ is expected to immediately converge to the target value $T_A$ by the free cooling control, and thus the controller 70 starts performing the free cooling control (step S13). Specifically, the controller 70 brings the outdoor air dampers 31a and 32a into the opened state and causes running of an indoor fan 21, resulting in a condition in which the outdoor air is taken into the passenger compartment PRM, while the compressor 13 and the outdoor fan 22 are stopped.

Conversely, when all of the above-described conditions (a) to (c) are not satisfied in step S11 (NO in step S11), the air cooling of the passenger compartment PRM by the free cooling control is impossible, and thus the controller 70 performs the refrigeration cycle control that starts the refrigeration cycle operation causing running of the compressor 13 in the aforementioned full-loaded state (step S14).

Specifically, the controller 70, while the outdoor air dampers 31a and 32a are kept in the closed state, controls the compressor 13 to be in a full-loaded state, and causes running of the thus controlled compressor 13, the indoor fan 21, and the outdoor fan 22. Due to such operation, the passenger compartment PRM is rapidly cooled by the refrigeration cycle device 10.

Meanwhile, when the free cooling performance value is lower than or equal to the indoor heat load value in step S12 (NO in step S12), the indoor temperature $T_C$ cannot immediately converge to the target value $T_A$ by the free cooling control, and thus the controller 70 performs the refrigeration cycle control that starts a weak refrigeration cycle operation causing running of the compressor 13 in the aforementioned unloaded state (step S15).

Specifically, the controller 70, while the outdoor air dampers 31a and 32a are kept in a closed state, controls the compressor 13 to be in an unloaded state, and causes running of the thus controlled compressor 13, the indoor fan 21, and the outdoor fan 22. Due to such operation, the passenger compartment PRM is cooled more rapidly by the refrigeration cycle device 10 than the free cooling control.

In step S14, the compressor 13 is run in a full-loaded state, while in step S15, the compressor 13 is run in an unloaded state, because S15 is conducted based on the premise that the free cooling start condition in step S11 is satisfied and that the difference between the indoor temperature $T_C$ and the target value $T_A$ is not substantially large. Thus, even when the refrigeration cycle device 10 degrades the capacity of the air cooling of the passenger compartment PRM, air cooling of the passenger compartment PRM is estimated to be sufficient.

The controller 70 determines whether the absolute value of the difference between the indoor temperature $T_C$ and the target value $T_A$ is below a predetermined threshold ε (step S16), after starting the free cooling control in step S13, after starting a refrigeration cycle operation in step S14, and after starting a refrigeration cycle weak operation in step S15.

When the absolute value of the difference between the indoor temperature $T_C$ and the target value $T_A$ is below the predetermined threshold ε (YES in step S16), since the indoor temperature $T_C$ converges sufficiently to the target value $T_A$ and there is no need to further continue the air cooling, the controller 70 stops: the free cooling control that is started in step S13, the refrigeration cycle that is started in step S14, or the refrigeration cycle weak operation that is started in step S15 (step S17).

The controller 70 monitors, even after the air cooling is stopped, whether the absolute value of the difference between the indoor temperature $T_C$ and the target value $T_A$ is lower than the threshold ε (step S18). When the absolute value of the difference between the indoor temperature $T_C$ and the target value $T_A$ is greater than or equal to the threshold ε (NO in step S18), processing returns to step S11 (RETURN). The controller 70 terminates the air-cooling control when receiving an external interruption to terminate commercial operation of the railroad vehicle TR.

As described above, according to the present Embodiment, even when the prior determination (step S11) determines, after the free cooling start condition is satisfied, that the air cooling of the passenger compartment PRM by the free cooling control is possible, the free cooling execution determination (step S12) determines whether to perform the free cooling control by comparing the free cooling performance value and the indoor heat load value.

The free cooling control is performed only when the free cooling performance value exceeds the indoor heat load value. Thus, the problem of losing comfort in the passenger compartment PRM due to the forced free cooling is less likely to occur.

The refrigeration cycle device 10 is configured to switch the capacity of the air cooling of the passenger compartment PRM between at least two levels. In particular, the compressor 13 can be switched between the full-loaded state and the unloaded state.

Upon determination, in the prior determination step (step S11), that air cooling of the passenger compartment by the free cooling control is impossible, the controller 70 performs the refrigeration cycle control to cause operation of the refrigeration cycle device 10 while the capacity of air cooling of the passenger compartment PRM is controlled to be in the relatively higher level of the two levels, that is, in a full-loaded state. Simultaneously, upon determination in the free cooling execution determination step (step S12) that the free cooling control is not to be performed, the controller 70 performs the refrigeration cycle control operating the refrigeration cycle device 10 while the capacity of the air cooling of the passenger compartment PRM is controlled to be in in the relatively lower level of the two levels, that is, in an unloaded state.

Therefore, upon determination in the free cooling execution determination step (step S12) that the free cooling control is not to be performed, although free cooling control is not performed, the capacity of the refrigeration cycle device 10 is degraded to achieve energy savings.

Embodiment 2

In the above Embodiment 1, when the free cooling performance value exceeds the indoor heat load value, the free cooling control continues before the absolute value of the difference between the indoor temperature and the target value is below the threshold ε. However, when the free cooling control continues for more than the predetermined period, the target value of the indoor temperature may possibly not be reached, and thus the air cooling by the refrigeration cycle device 10 may be started in some free cooling controls. Specific examples are described below.

Figure 5:
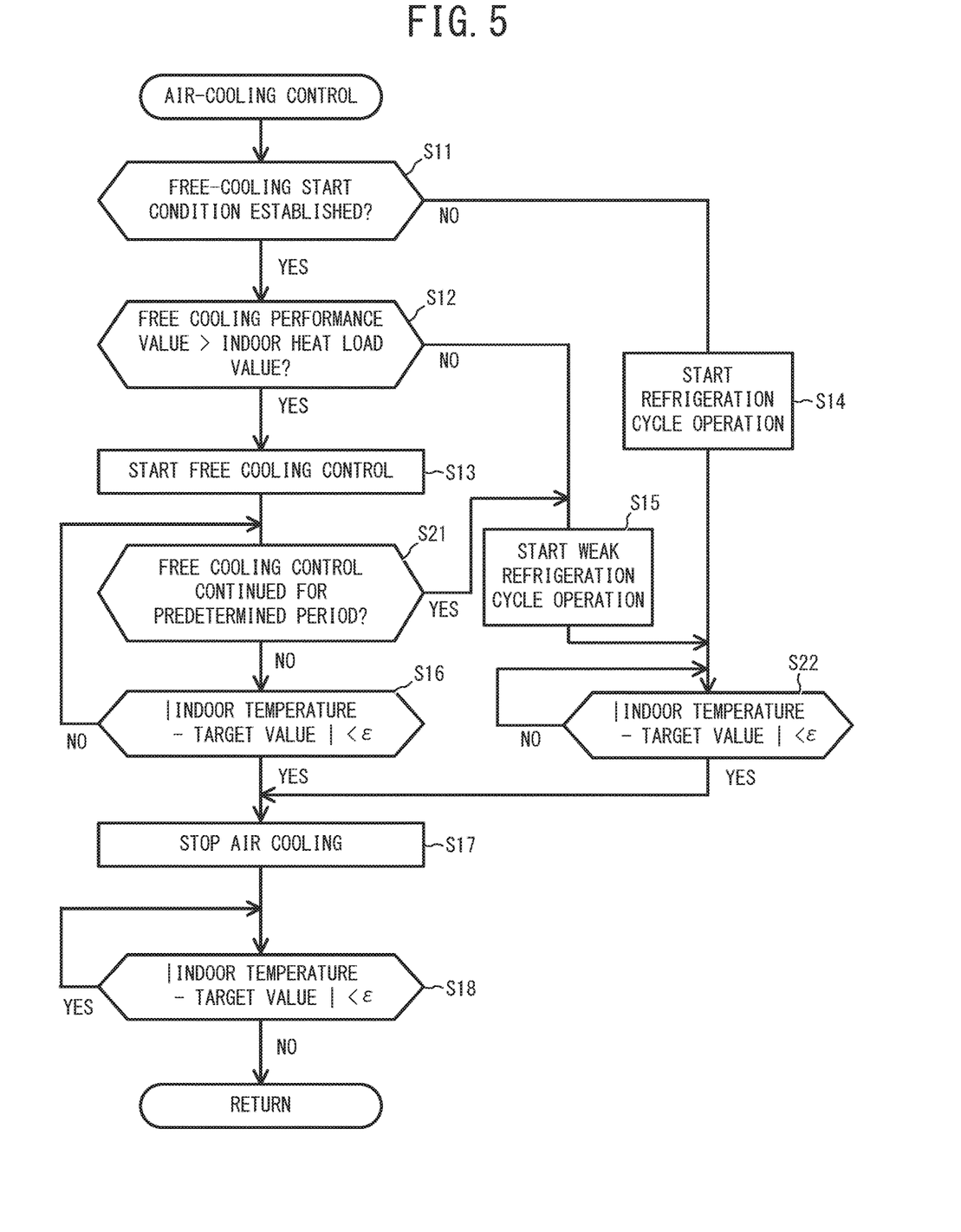
FIG. 5 is a flow chart illustrating procedures of the air-cooling control according to Embodiment 2.

According to the present embodiment shown in FIG. 5, the controller 70, after starting the free cooling control (step S13), determines whether the period of free cooling control continues for a predetermined period that is set in advance (step S21). Before the predetermined period elapses (NO in step S21), the controller 70, in a manner similar to that of Example 1, continues free cooling control before the absolute value of the difference between the indoor temperature $T_C$ and the target value $T_A$ is below the threshold ε (steps S16 and S17).

In contrast, upon continuation of free cooling control for more than the predetermined period (YES in step S21), the controller 70 stops free cooling control and starts a refrigeration cycle weak operation by the refrigeration cycle device 10 (step S15). In particular, the controller 70, while the indoor fan 21 is allowed to run, controls the outdoor air dampers 31a and 32a in the closed state, causes the compressor 13 to run in an unloaded state, and also causes the outdoor fan 22 to run.

Furthermore, the controller 70, in the same manner as in Embodiment 1, performs the refrigeration cycle weak operation by the refrigeration cycle device 10 before the absolute value of the difference between the indoor temperature $T_C$ and the target value $T_A$ is below the threshold ε (step S22).

The operations other than these are the same as those in Example 1, and therefore the details thereof are omitted.

As described above, according to the present embodiment, when the free cooling control continues for a predetermined period, free cooling control terminates, and air cooling by the refrigeration cycle device 10 starts. Thus, the problem of the forced continuation of the free cooling is avoided.

Embodiment 3

In above Embodiment 1, after the start of free cooling control, free cooling control continues before the absolute value of the difference between the indoor temperature $T_C$ and the target value $T_A$ is below the threshold ε. However, the doors of the railroad vehicle TR open when the railroad vehicle TR arrives at the next station, and this lowers the temperature in the passenger compartment PRM due to the outdoor air flowing into the passenger compartment PRM. Thus, if estimation is possible that the temperature in the passenger compartment PRM will lower so as to be comfortable enough after the doors are opened at the next station, free cooling control may be stopped even when the current indoor temperature is not cooled down to the temperature close to the target temperature. Hereinafter, a specific example is described below.

Figure 6:
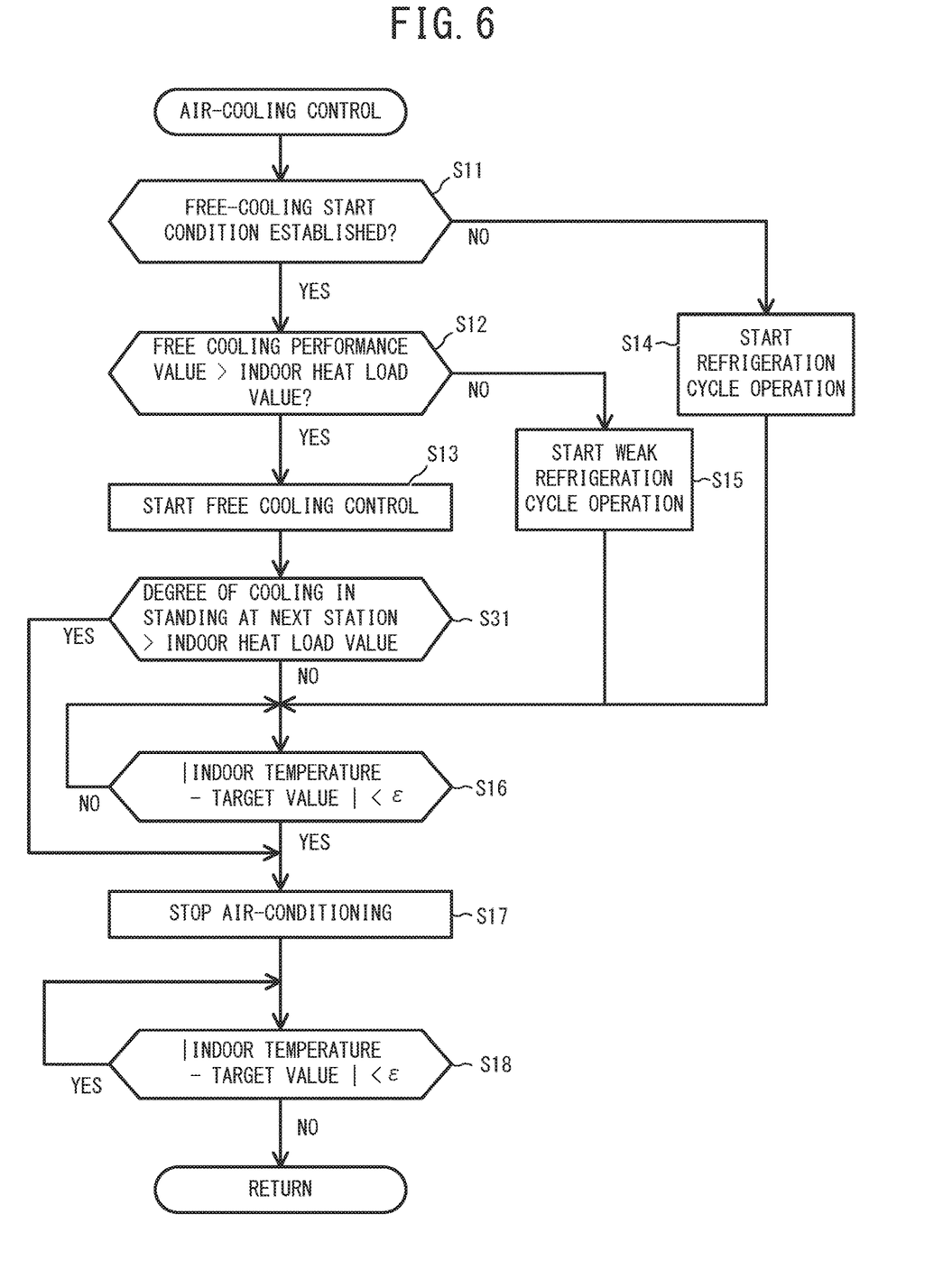
FIG. 6 is a flow chart illustrating procedures of the air-cooling control according to Embodiment 3.

As shown in FIG. 6, according to the present embodiment, the controller 70, after starting the free cooling control (step S13), determines whether a degree of cooling in standing at the next station, indicating a degree of a decrease in the indoor temperature at the time that the railroad vehicle TR stands at the next station, exceeds the aforementioned indoor heat load value (step S31). This is explained below in detail.

The degree of cooling in standing at the next station is a physical amount indicating a degree of a decrease in the indoor temperature due to communication between the passenger compartment PRM and the outside in the period in which the railroad vehicle TR stands at the next station. The degree of cooling in standing at the next station is defined so as to increase when an period T[s] in which the doors of the railroad vehicle TR open at the next station is longer, and increase when a temperature difference ΔB[° C.] obtained by subtracting the outdoor air temperature $T_B$ from the indoor temperature $T_C$ increases.

In particular, the controller 70 calculates the degree of cooling in standing at the next station [W] in accordance with the following formula (4), where a proportionality constant is $C_6$[W/s/° C.]

Degree of cooling in standing at the next station
[W]=$C_6$[W/s/° C.]∎T[s]∎ΔB[° C.]      (4)

Here, a value of the proportionality constant $C_6$[W/° C.] is assumed to be previously stored in the storage 72 shown in FIG. 3. Furthermore, the storage 72 shown in FIG. 3 previously stores a table that associates a station and a period T[s] of opening of the doors while the railroad vehicle is standing at the station.

The controller 70 identifies the next station based on information obtained from the operation control device that controls operation in a driver cab of the railroad vehicle TR, information specifying a station obtained wirelessly from the facility of the station, information on the number of times the door has opened so far specified by a sensor that detects when the door has been opened, or information obtained from a global positioning system (GPS). Furthermore, the controller 70 identifies the door opening period T[s] that corresponds to the identified next station, and substitutes the period into the above formula (4) to calculate the degree of cooling in standing at the next station [W].

The controller 70 determines, in the above step S31, whether the degree of cooling in standing at the next station is greater than the aforementioned indoor heat load value. This determination corresponds to determining whether the temperature in the passenger compartment PRM is estimated to be a temperature close to the target value $T_A$.

When the degree of cooling in standing at the next station is lower than or equal to the aforementioned indoor heat load value in the above step S31 (NO in step S31), the temperature in the passenger compartment PRM at the next station is estimated not to approach the target value $T_A$, and thus the controller 70 continues the free cooling control before the absolute value of the difference between the indoor temperature $T_C$ and the target value $T_A$ is below the threshold ε (step S16).

In step S31, when the degree of cooling in standing at the next station exceeds the aforementioned indoor heat load value (YES in step S31), the temperature in the passenger compartment PRM at the next station is estimated to be a temperature close to the target value $T_A$. Thus, the controller 70 performs stopping control that stops the free cooling control by stopping the indoor fan 21 shown in FIG. 1 (step S17). Operations other than these are the same as those in Embodiment 1, and therefore the details thereof are omitted.

As described above, according to the present embodiment, during the free cooling control, after determination that the air cooling of the passenger compartment PRM by the free cooling control is possible (YES in step S11), the controller 70 determines whether the temperature in the passenger compartment PRM is estimated to approach the target value $T_A$ due to communication between the passenger compartment PRM with the outside within a period T[s] in which the railroad vehicle TR is standing at the next station (step S31). When the temperature in the passenger compartment PRM is estimated to approach the target value $T_A$ (YES in step S31), the controller 70 performs stopping control that stops the indoor fan 21 while the compressor 13 is kept stopped (step S17). Therefore, electric power consumption by the indoor fan 21 can be decreased, which achieves energy savings greater than heretofore.

Allowing continuation of free cooling control before the railroad vehicle TR arrives at the next station suffers from possible occurrence of excessive lowering of the indoor temperature $T_C$ when the doors are open at the next station. Alternatively, in the present embodiment, the free cooling control can be stopped before the railroad vehicle TR reaches the next station, and therefore, the indoor temperature $T_C$ is not likely to lower excessively at the next station.

Embodiments of the present disclosure are described above. However, the present disclosure is not limited to these embodiments, and the following modifications can be applied.

In the above Embodiments 1 to 3, switching of the capacity of the air cooling of a refrigeration cycle device 10 is achieved with the compressor 13 that can mechanically switch capacity. However, the refrigeration cycle device 10 for switching the capacity of air cooling between at least two levels is not limited to this configuration. Alternatively, the switching between capacities of the air cooling of the refrigeration cycle device 10 can be achieved by varying operation frequency of the compressor 13, or by varying the number of the compressors 13 to be made to run when the multiple compressors 13 are used. In particular, the above refrigeration cycle weak operation can be achieved also by setting the compressor 13 to a state in which the operation frequency is relatively reduced, or by reducing relatively the number of the compressors 13 to be made to run.

Although in the above Embodiment 1 the outdoor air dampers 31a and 32a are changed between the opened state and a closed state, and the degree of opening of the outdoor air dampers 31a and 32a may be continuously controllable, or may be controllable in multiple steps, that is, in three or more steps, or without steps. In such a case, the controller 70 may control the degrees of opening of the outdoor air damper 31a and 32a in response to the indoor heat load value so that the degrees of the opening of the outdoor air dampers 31a and 32a increases with an increasing indoor heat load value during the free cooling control.

Furthermore, although a return damper, as a valve that adjusts flow rate of inside air passing through return ports APa and APb, is omitted from FIG. 1, the controller 70 can control the return damper. The controller 70 can efficiently take the outdoor air into the passenger compartment PRM by setting the return damper to be in the closed state during the free cooling control. Furthermore, the controller 70 may vary, during the free cooling control, a proportion of the degree of opening of the outdoor air dampers 31a and 32a relative to the degree of opening of the return damper based on indoor heat load value and indoor temperature.

In the above Embodiment 3, free cooling is started upon determination, the free cooling execution determination (step S12), that free cooling control is to be performed. Alternatively, the free cooling execution determination (step S12) may be skipped to start the free cooling when the free cooling start condition is established in the prior determination (step S11). In such a case, while the compressor 13 is kept stopped, stopping control also stops the indoor fan 21 (step S17), and therefore, energy savings due to a decrease in electric power consumption by the indoor fan 21 can be achieved.

In the above Embodiments 1 to 3, a configuration is illustrated in which the refrigeration cycle device 10 is provided on the ceiling part of the railroad vehicle TR, but the location of installation of the refrigeration cycle device 10 is not limited specifically to the ceiling part. The refrigeration cycle device 10 may be installed under the floor part of the railroad vehicle TR. Alternatively, constituent elements of the refrigeration cycle device 10 may be separately installed at different locations. Specifically, among the constituent elements of the refrigeration cycle device 10, an outdoor unit including an outdoor heat exchanger 14 and an indoor unit including an indoor heat exchanger 11 may be installed separately.

A case is described in Embodiments 1 to 3 in which the vehicle is the railroad vehicle TR, but the vehicle is not limited to the railroad vehicle TR. In the present description, the meaning of the term "vehicle" includes a concept also encompassing a motor vehicle such as a bus. Furthermore, in the description, the meaning of the term "station" includes a concept also encompassing a motor vehicle station such as a bus stop as well as a railroad vehicle TR station.

The control program 71 as shown in FIG. 3 can be installed in a computer, so that the computer can function as the controller 70. The control program 71 can be distributed via a communication line, or by being stored in a computer-readable recording medium such as an optical disk, a magnetic disk, a magnet-optical disk, and a flash memory.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2017-114882, filed on Jun. 12, 2017, the entire disclosure of which is incorporated by reference herein.

INDUSTRIAL APPLICABILITY

A vehicle air-conditioning apparatus and a method of air-cooling thereof according to the present disclosure are applicable to air cooling of a passenger compartment of a vehicle.

REFERENCE SIGNS LIST

10 Refrigeration cycle device
11 Indoor heat exchanger (evaporator)
11a First indoor heat exchanger
11b Second indoor heat exchanger
12 Gas-liquid separator
13 Compressor
14 Outdoor heat exchanger (condenser)
25 Expander
16 Refrigerant pipe
21 Indoor fan (outdoor air intake fan)
22 Outdoor fan
31, 32 Outdoor air damper device
31a, 32a Outdoor air damper
31b, 32b Outdoor air damper driving device
40 Outdoor air temperature measurer
50 Indoor temperature measurer
60 Load measurer
70 Controller
71 Control program
72 Storage
73 Processor
100 Vehicle air-conditioning apparatus
TR Railroad vehicle (vehicle)
PRM Passenger compartment
CS Casing
IR Indoor unit chamber
APa, APb Return port
DT Duct

The invention claimed is:

1. A vehicle air-conditioning apparatus comprising:
a refrigeration cycle device attached to a vehicle and including a compressor, the refrigeration cycle device being configured to form, with the compressor, refrigeration cycle for air cooling of a passenger compartment of the vehicle, the compressor being configured to circulate refrigerant in the refrigeration cycle;
an outdoor air damper device switchable between an opened state in which outdoor air is allowed to be taken into the passenger compartment and a closed state in which the outdoor air is blocked from being taken into the passenger compartment;
an outdoor air temperature measurer to measure an outdoor air temperature that is a temperature of the outdoor air;
an indoor temperature measurer to measure an indoor temperature that is a temperature in the passenger compartment; and a controller to perform
  refrigeration cycle control to cause the refrigeration cycle device to air-cool the passenger compartment, and
  free cooling control to take the outdoor air into the passenger compartment by controlling the outdoor air damper device to be in the opened state, while the compressor is stopped,
wherein the controller performs
  a prior determination by determining whether the air cooling of the passenger compartment by the free cooling control is possible, based on a predetermined target value of the temperature in the passenger compartment, the outdoor air temperature measured with the outdoor air temperature measurer, and the indoor temperature measured with the indoor temperature measurer, and
  a free cooling execution determination by determining, upon the air cooling of the passenger compartment by the free cooling control being determined to be possible in the prior determination, whether to perform the free cooling control by comparing a free cooling performance value and an indoor heat load value, wherein
  the free cooling performance value depends on a temperature difference between the outdoor air temperature and the indoor temperature and indicates a capacity of air cooling by the free cooling control, and
  the indoor heat load value depends on a vehicle occupancy rate of passengers in the passenger compartment and indicates a difficulty of a temperature decrease in the passenger compartment.

2. The vehicle air-conditioning apparatus according to claim 1, wherein
  the refrigeration cycle device is configured to switch a capacity of the air cooling of the passenger compartment between at least two levels, and
  the controller,
    upon determination, in the prior determination, that the air cooling of the passenger compartment by the free cooling control is not possible, performs the refrigeration cycle control while the capacity of the refrigeration cycle device is controlled at a relatively higher level among the at least two levels, and
    upon determination, in the free cooling execution determination, that the free cooling control is not to be performed, performs the refrigeration cycle control while the capacity of the refrigeration cycle device is controlled to be a relatively lower level among the at least two levels.

3. A vehicle air-conditioning apparatus comprising:
  a refrigeration cycle device attached to a vehicle and including a compressor, the refrigeration cycle device being configured to form, with the compressor, refrigeration cycle for air cooling of a passenger compartment of the vehicle, the compressor being configured to circulate refrigerant in the refrigeration cycle;
  an outdoor air damper device switchable between an opened state in which outdoor air is allowed to be taken into the passenger compartment and a closed state in which the outdoor air is blocked from being taken into the passenger compartment;
  an outdoor air intake fan to form, when the outdoor air damper device in the opened state is operated, airflow to take the outdoor air into the passenger compartment through the outdoor air damper device;
  an outdoor air temperature measurer to detect an outdoor air temperature that is a temperature of the outdoor air;
  an indoor temperature measurer to detect an indoor temperature that is a temperature in the passenger compartment; and
  a controller to perform
    refrigeration cycle control to cause the refrigeration cycle device to air-cool the passenger compartment, and
    free cooling control to take the outdoor air into the passenger compartment by controlling the outdoor air damper device to be in the opened state and activating the outdoor air intake fan, while the compressor is stopped,
  wherein the controller performs
    a prior determination by determining whether the air cooling of the passenger compartment by the free cooling control is possible, based on a predetermined target value of the temperature in the passenger compartment, the outdoor air temperature measured with the outdoor air temperature measurer, and the indoor temperature measured with the indoor temperature measurer, and
    stop control by causing stoppage of the outdoor air intake fan while the compressor is kept stopped, when the indoor temperature is estimated to be a temperature close to the target value after determining, during performing of the free cooling control, whether the indoor temperature is estimated to be a temperature close to the target value due to communication between the passenger compartment and an outside during a period in which the vehicle stands at a next station, the free cooling control being performed after the prior determination in which the air cooling of the passenger compartment by the free cooling control is determined to be possible.

4. The vehicle air-conditioning apparatus according to claim 3,
  wherein the controller further performs a free cooling execution determination by determining, upon the air cooling of the passenger compartment by the free cooling control being determined to be possible in the prior determination, whether to perform the free cooling control by comparing a free cooling performance value and an indoor heat load value, wherein
    the free cooling performance value depends on a temperature difference between the outdoor air temperature and the indoor temperature and indicates a capacity of air cooling by the free cooling control, and
    the indoor heat load value depends on a vehicle occupancy rate of passengers in the passenger compartment and indicates a difficulty of a temperature decrease in the passenger compartment, and
  the controller starts the free cooling control upon determination, in the free cooling execution determination, that the free cooling control is to be executed.

5. The vehicle air-conditioning apparatus according to claim 3, wherein, in the prior determination, when (i) a value obtained by subtracting the outdoor air temperature from the indoor temperature is greater than or equal to a predetermined first threshold and (ii) a value obtained by subtracting the target value from the indoor temperature is lower than or equal to a predetermined second threshold, the controller determines that the air cooling of the passenger compartment by the free cooling control is possible.

6. A method for air-conditioning by a vehicle air-conditioning apparatus, the method comprising:
- a prior determination step of determining whether air cooling of a passenger compartment of a vehicle by free cooling control that takes outdoor air into the passenger compartment with an outdoor air intake fan is possible while a refrigeration cycle device attached to the vehicle for air cooling of the passenger compartment is stopped; and
- a free cooling execution determination step of determining, upon the air cooling of the passenger compartment by the free cooling control being determined to be possible in the prior determination step, whether to perform the free cooling control by comparing a free cooling performance value and an indoor heat load value, wherein
  - the free cooling performance value depends on a temperature difference between an outdoor air temperature that is a temperature of the outdoor air and an indoor temperature that is a temperature in the passenger compartment, and indicates a capacity of air cooling by the free cooling control, and
  - the indoor heat load value depends on a vehicle occupancy rate of passengers in the passenger compartment and indicates a difficulty of a temperature decrease in the passenger compartment.

7. The method according to claim 6, further comprising:
a stop control step of stopping the outdoor air intake fan while the refrigeration cycle device is kept stopped when a temperature in the passenger compartment is estimated to be a temperature close to a predetermined target value after determining, during performing of the free cooling control, whether the temperature in the passenger compartment is estimated to be a temperature close to the target value due to communication between the passenger compartment and an outside during a period in which the vehicle stands at a next station, the free cooling control being performed after the free cooling execution determination step in which the free cooling control is determined to be executed.

* * * * *